United States Patent [19]

Uozumi

[11] 4,232,611

[45] Nov. 11, 1980

[54] GUIDED VEHICLE FOR GUIDE-WAY TRANSPORTATION SYSTEM

[75] Inventor: Yukio Uozumi, Kobe, Japan

[73] Assignee: Kawasaki Jukogyo Kabushiki Kaisha, Hygo, Japan

[21] Appl. No.: 798,669

[22] Filed: May 19, 1977

[30] Foreign Application Priority Data

May 21, 1976 [JP] Japan ........................ 51-58672

[51] Int. Cl.² .................. B61B 13/04; B61F 9/00; B62D 11/00
[52] U.S. Cl. ...................... 105/215 R; 104/120; 104/243; 104/246; 105/138
[58] Field of Search ............ 104/120, 246, 243, 247, 104/245; 105/215 R, 138, 184; 267/65 D

[56] References Cited

U.S. PATENT DOCUMENTS

| | | | |
|---|---|---|---|
| 1,268,942 | 6/1918 | Eaton | 105/184 X |
| 1,810,834 | 6/1931 | Klein | 105/138 X |
| 3,312,180 | 4/1967 | Mueller | 104/246 |
| 3,338,182 | 8/1967 | Maestrelli | 105/167 X |
| 3,593,667 | 7/1971 | Morris | 104/120 |
| 3,701,323 | 10/1972 | Cox | 104/245 X |
| 3,933,368 | 1/1976 | Kellett | 267/65 D X |

OTHER PUBLICATIONS

Olley, Maurice; Leveling Devices Permit Softer Rides, SAE Journal, Mar. 1956, pp. 54-58 inclusive.

*Primary Examiner*—John J. Love
*Assistant Examiner*—Howard Beltran
*Attorney, Agent, or Firm*—Stevens, Davis, Miller & Mosher

[57] ABSTRACT

A guide-way vehicle adapted for running on guide way means having running surface means and guide rail means on the running surface means, wherein the vehicle comprises three axle assemblies provided at front and rear end portions and an intermediate portion of a car body, each axle assembly having wheels with rubber tires attached to the opposite ends thereof. The axle assemblies at the front and rear portions of the car body are adapted to swivel in a horizontal plane relative to the car body and respectively have guide wheels adapted for running along the guide rail means whereby the axle assemblies are steered along the guide rail means. Separate driving power means for driving the wheels are provided at the opposite ends of the intermediate axle assembly independently to each other, each of the front and rear axle assemblies bearing a load share of the vehicle weight less than that of the intermediate axle assembly in static load distribution and each tire in the front and rear axle assembly having an allowable load limit which is less than that of the tire in the intermediate axle assembly.

7 Claims, 14 Drawing Figures

FIG. 9
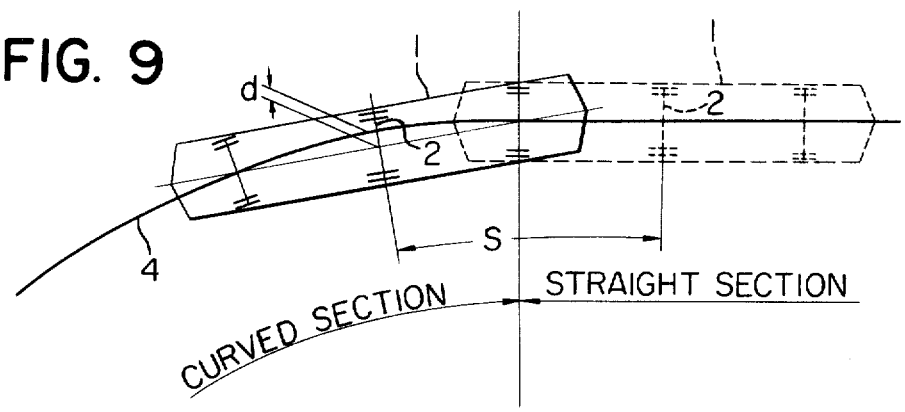
FIG. 10
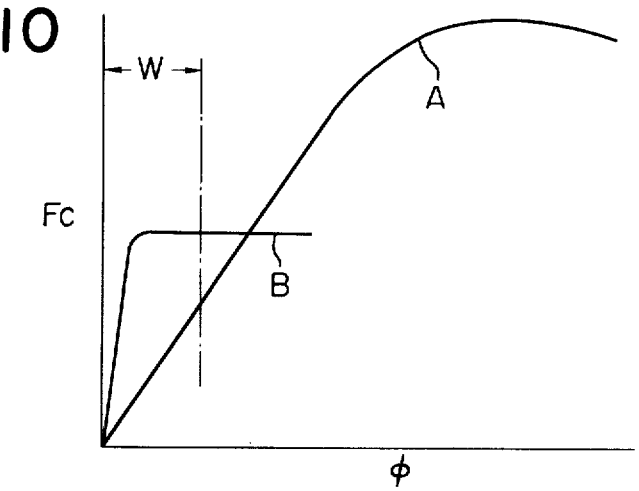
FIG. 11　　　FIG. 12
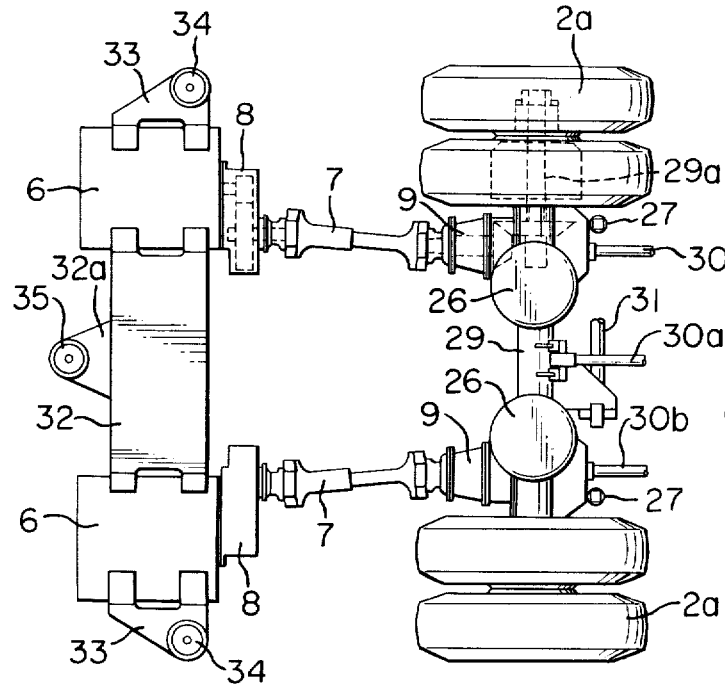
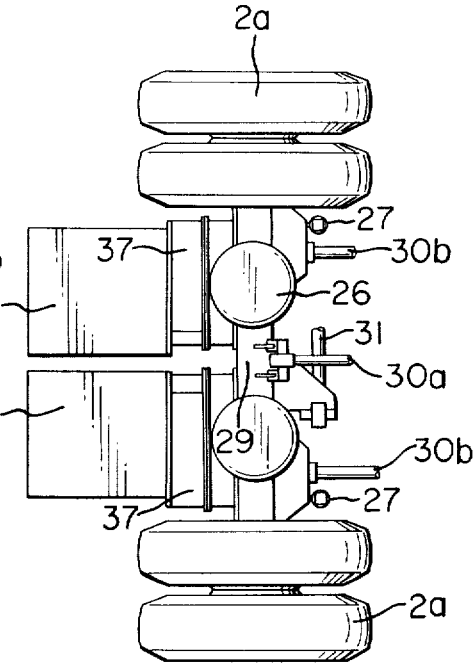

GUIDED VEHICLE FOR GUIDE-WAY TRANSPORTATION SYSTEM

BACKGROUND OF THE INVENTION

The invention relates to a guide way vehicle of the type having running wheels for rolling on one or more running surfaces of guide way means and guide wheels for rolling along guide rail means disposed along the running surfaces. More particularly, the invention relates to a guide way vehicle of the above type having rubber tires, preferably pneumatic tires.

It has been recognized that railway vehicles having wheels with rubber tires are advantageous in that they produce less noise and consequently there will be fewer problems even if they are used in cities. Further, since such vehicles have excellent climbability due to employment of rubber tires, it is possible to construct railways with steeper gradients with greater economy.

On the other hand, a vehicle having rubber wheel tires is especially required to have reduced overall weight for the purpose to facilitate long tire life; however, since vehicles of this type generally have relatively bulky wheel tires and driving mechanisms therefor, it is not always possible to reduce the vehicle weight sufficiently.

Further, since it is required to use rubber tires of large diameter, the overall height of such vehicle must necessarily be increased. Consequently, disadvantages have been encountered when it is required to construct railways having tunnels and/or bridges.

Still further, when use is made of pneumatic rubber tires, there is a possibility that the tires may burst, although it is a rare case, and thus it may interfere with the safe running of the vehicle.

SUMMARY OF THE INVENTION

The present invention is intended to solve the above problems of the prior art and provide an improved construction for a guide way vehicle.

In one aspect of the invention there is provided a simple and light weight construction of a bogie truck and a driving gear unit of a guide way vehicle by employing an unique arrangement of rubber tires.

In another aspect of the invention, there is provided a vehicle having a small overall height which can be attained by careful selection of proper tire-diameter and bogie truck construction, collectively.

In a still further aspect of the invention, there is provided a vehicle which is perfectly free of danger which may be caused by a tire-burst encountered while it is under service running.

A guide way vehicle according to the present invention therefore comprises a car body supporting bogie truck including three axle assemblies, one for supporting the intermediate section of the car body and the other two for supporting respectively the front and rear sections of the car body, each axle assembly having running wheels with rubber tires at the opposite end portions, each of the front and rear axle assemblies being adapted to swivel relative to the car body and provided with a set of guide wheels whereby the axle assembly is steered along the guide way. The guide wheels are positioned with their rotating planes disposed horizontally so as to roll along web surfaces of a guide rail disposed on and projecting from a running surface along the center line of the guide way. The other axle assembly disposed at the intermediate section of the car body is attached thereto so as not to swivel relative to the car body, and the wheels on the opposite ends are driven by individual power means such as electric motors through the respective power transmitting reduction gears. The load share on each of the front and rear axle assemblies is set to be smaller than that on the intermediate driving axle assembly so that the outer diameter of rubber tires used at the front and rear axle assemblies may be smaller than that of tires used at the intermediate axle assembly. One of the essential features of the invention resides in the above mentioned wheel arrangements on three axle assemblies.

It is possible to eliminate difficulties of uneven motion due to side slip which may possibly be encountered while a vehicle of the type is going into or out of a curved guide way section by providing guide wheels adapted for steering the front and rear axle assemblies by the guided wheels and simultaneously utilizing rubber tire-wheels for its running wheels.

Considering the fact that, when a vehicle is running along a circular curved path, the transverse axis of the intermediate axle assembly will always be directed substantially normally with respect to the curvature of the path, the central axle assembly requires no steering mechanism and can be easily utilized as the vehicle driving axles. Therefore, according to the present invention there can be obtained a much simpler driving system for transmitting driving power from a propulsion unit to driving wheels.

In general, when it is required to produce greater traction force at the driving wheels, the driving axle should have a correspondingly large load share which is sufficient to give the driving wheels a proper anti-skid safety factor to prevent skidding of the tire tread. For this reason, the driving axle assembly is required to bear a greater load share than each of the front and rear axle assemblies and, thus, the driving wheels should be of a diameter greater than that of running tires on the front and rear axle assemblies. Namely, according to the present invention, running wheels can be designed to be of small diameter and primary difficulties encountered previously in designing the bottom part of the car body can thus be eliminated. Concurrently, since the heavily loaded driving wheels do not conduct any swivel motion, it causes no difficulties in designing the car body construction even if driving tires of large diameter should be utilized. Moreover, in a preferred aspect of the present invention, a dual tire arrangement is utilized for each of the running wheel tires to enable use of tires of further less diameter so that there can be obtained an important advantage of further lowering the overall height of a vehicle in cooperation with the other features of the present invention as above set forth.

It should be further noted that, through the use of dual tires, especially pneumatic rubber tires, at each side of each axle assembly, it is possible to provide an important feature of increasing the safety factor while running in addition to the feature of lowering the overall height of the vehicle. In other words, by employing a dual tire it is possible to use a wheel tire having a capacity sufficiently greater than required to bear with its load share and, therefore, the possibility of tire burst can significantly be decreased and even if a tire burst should happen, safe running of the vehicle could be maintained by the remaining tire which is still available.

As above set forth, the present invention is intended to provide various advantageous effects by combining several distinguishing constructional features as above described.

BRIEF DESCRIPTION OF DRAWINGS

FIG. 9 is a plan view showing side slip which takes place while the vehicle is going from a straight section into a successive curved section of a guide way;

FIG. 10 is a diagram showing characteristics of side slip resistance of wheels with respect to side slip angle;

FIG. 11 is a plan view showing another embodiment of intermediate bogie of a vehicle of the invention;

FIG. 12 is a plan view showing a still another embodiment of intermediate bogie of a vehicle of the invention;

Now, preferred embodiments of the present invention will be described in detail with reference to the attached drawings.

Figure 1:
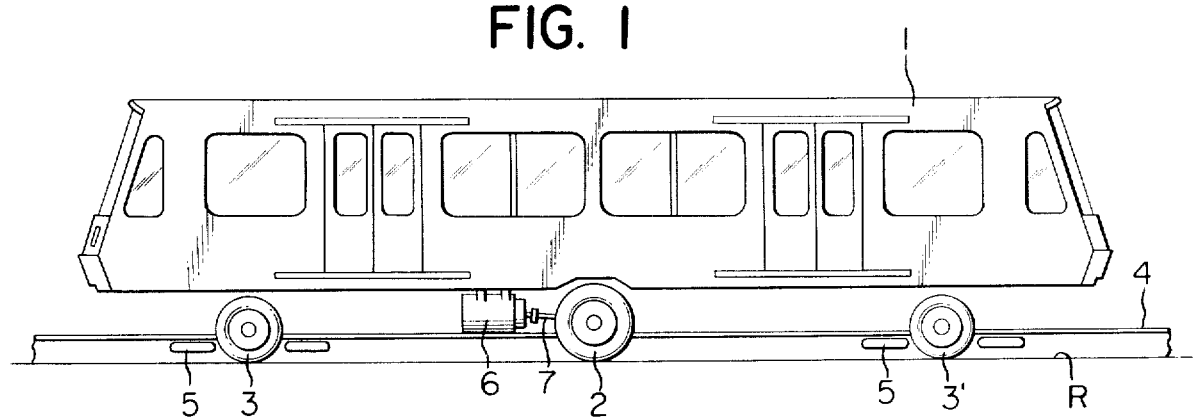
FIG. 1 is a side view of an exemplified guide way vehicle according to the invention.
Figure 2:
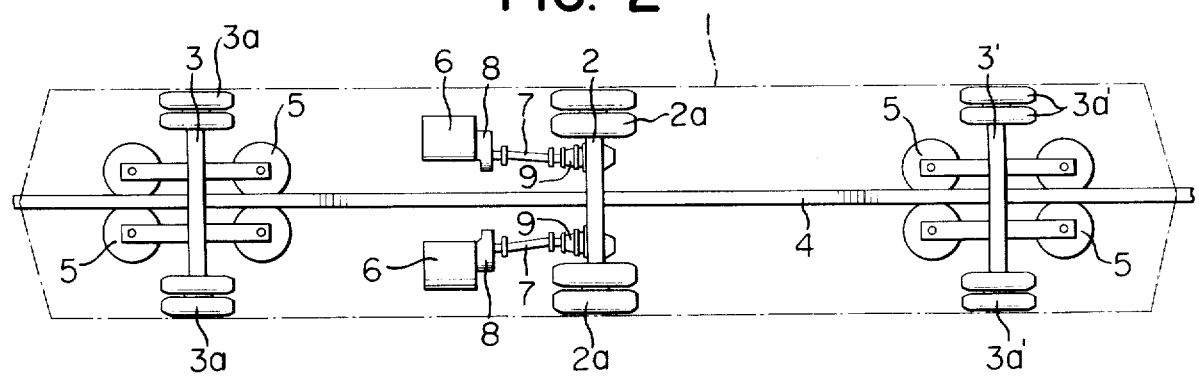
FIG. 2 is a plan view of a bogie-truck arrangement of the vehicle of FIG. 1.

In FIG. 1 showing a side view of a guide way vehicle and FIG. 2 showing its wheel arrangement according to the present invention, a car body 1 of the vehicle is supported on three axle assemblies comprising a central axle assembly 2 for driving the vehicle disposed at intermediate portion of the car body and two swivel axle assemblies 3, 3' disposed at the front and rear portions of the car body. The vehicle 1 travels on a guide way having running surface means R and guide rail means 4 disposed along the center of the running surface means, and each of the swivel axle assemblies 3, 3' also comprises a set of guide wheels 5 mounted thereon and adapted to hold therebetween the guide rail 4.

Each axle oppositely provided in the intermediate axle assembly 2 is driven by an associated electric propulsion motor 6 mounted on the car body through a power train including a reduction gear unit 8, a propellier shaft 7 and a second reduction gear unit 9. As shown in FIGS. 1 and 2, dual rubber tires 2a, 3a and 3a' are mounted on the opposite ends of the axle assemblies 2, 3 and 3', respectively. Each tire 2a on the driving axle assembly 2 has a diameter greater than that of the tires 3a and 3a' on the other two axle assemblies 3 and 3' and, therefore, the overall height of the vehicle may be lowered by providing cut-away configurations at the bottom parts of the car body for partially accommodating the tires 2a therein. It should be noted that, since the driving axle assembly is not allowed to swivel, the overall height of the vehicle may be appropriately decreased without necessity of such long dimensions of cut-away configurations as previously required.

At the front and rear portions of the car body it is unnecessary to provide any bottom cut-away configurations because the rubber tires 3a, 3a' on the swivel axle assemblies 3, 3' are of a small diameter and free of intervention with the car body. According to such the arrangement, it is possible to make the construction of the car body easier and also make the overall height of the vehicle substantially smaller.

The right and left hand dual wheel 2a attached to the opposite ends of the drive axle 2 are separately driven by their individual electric propulsion motors 6 through propeller shafts 7 and therefore, each of the wheels may be driven at a different speed from each other while the vehicle moves in a curved guide way section. Accordingly, in this arrangement it is unnecessary to provide a means, such as differential gear adapted for allowing the right and left drive wheels 2a to rotate at different speeds. However, such an arrangement for providing a single electric propulsion motor and a differential gear associated therewith should also be considered to be within the scope of the invention.

Since the two swivel axle assemblies 3 and 3' provided at the front and rear portions of the car body have substantially the same arrangement, description of the detailed construction thereof will be made with respect to only one assembly 3 as shown in FIGS. 3, 4, 5 and 6.

Above the swivel axle assembly 3 there is provided a bolster 13 disposed in parallel with and supported by the swivel axle assembly 3 through a pneumatic spring 11 and shock absorbers 12. On the center of the upper surface of the bolster 13 there is provided a center plate 14 through which the car body 1 is supported by the bolster 13 which enables the axle assembly to swivel relative to the car body.

Figure 3:
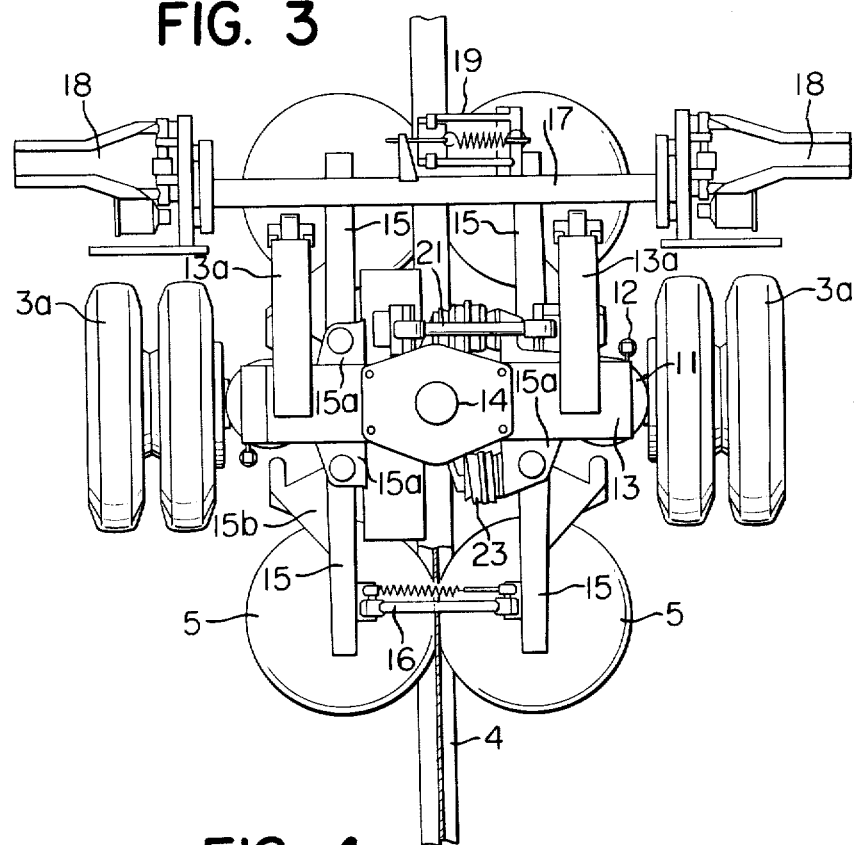
FIG. 3 is a plan view showing in detail a swivel bogie construction for front or rear suspension of the vehicle.
Figure 5:
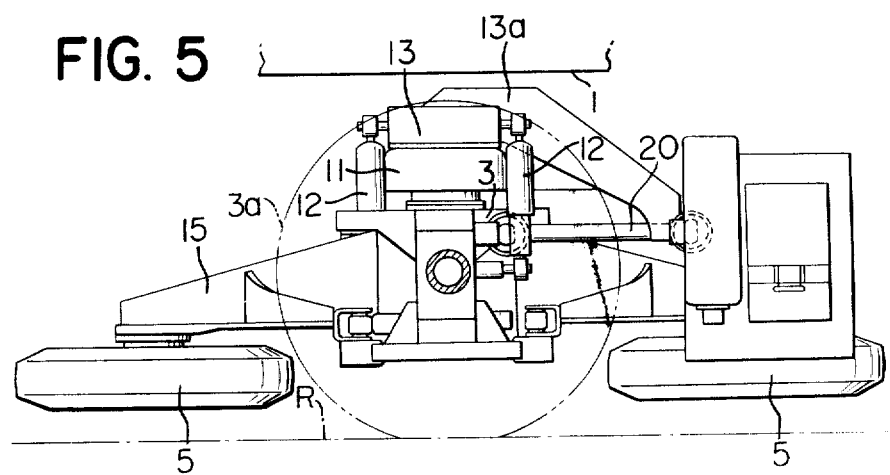
FIG. 5 is a side view of the swivel bogie of FIG. 3.

To the bolster 13 there are secured two forwardly extending arms 13a at their one ends as shown in FIGS. 3 and 5, and the opposite ends of the arms 13a are vertically pivotably connected to the forward ends of connecting rods 20 extending from the swivel axle assembly 3. The rear ends of the connecting rods 20 are vertically pivotably connected to the swivel axle assembly 3.

Figure 4:
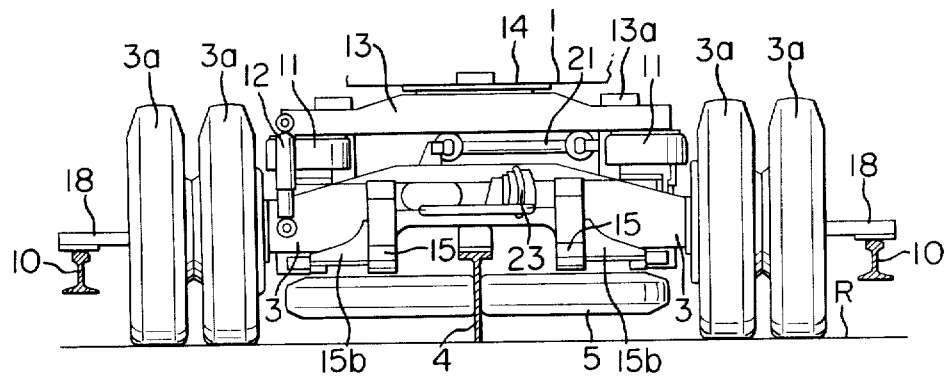
FIG. 4 is a front view of the swivel bogie of FIG. 3.

Further, as shown in FIGS. 3 and 4, transversely extending connecting rods 21 are vertically pivotally connected at their one ends to the bolster 13, and also vertically pivotally connected at their other ends to the swivel axle assembly 3. According to this arrangement, there is provided between the swivel axle assembly 3 and the bolster 13 a connecting means adapted to allow the vertical relative movement but to prevent horizontal relative movement therebetween.

On each of the front and rear of the swivel axle assembly 3, there are provided support brackets 15a secured to either side of the axle assembly, on each of the brackets 15a there being mounted a guide wheel mounting arm 15 pivotally movable in a horizontal plane. On the other end of each arm 15 there is mounted a guide wheel 5 which is positioned in horizon and freely rotatable in a horizontal plane. Every two mounting arms 15 extending either forwardly and rearwardly from the axle assembly forms a cooperating pair, whose arms 15 are urged toward each other by a preloaded spring means 16 in order to urge the associated pair of guide wheels 5 into engagement with the opposite side surfaces of the guide rail 4.

Figure 6:
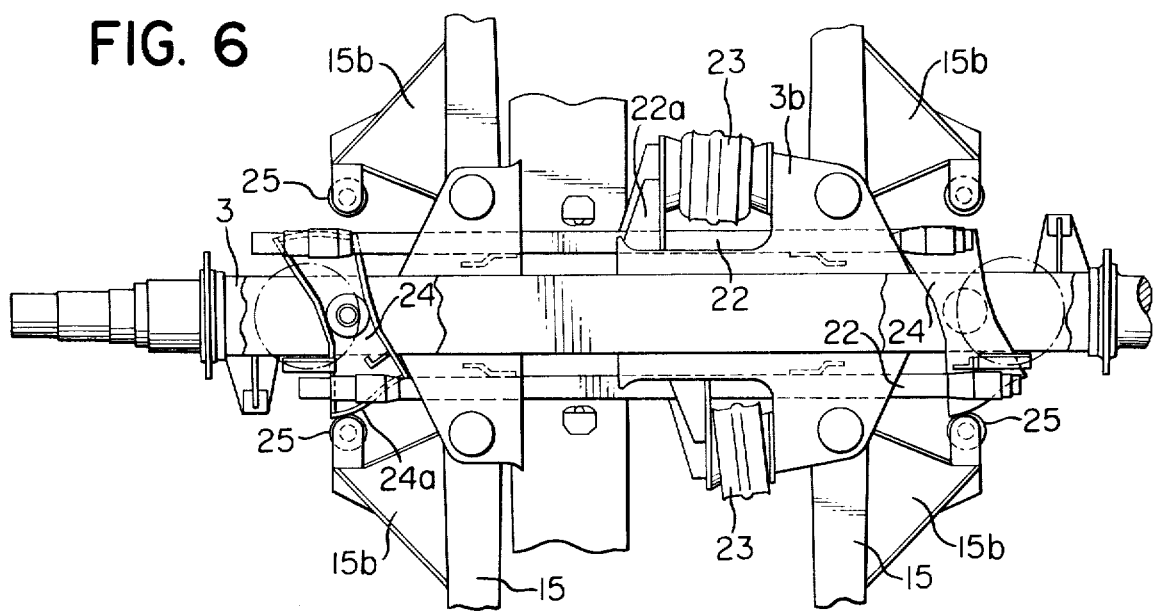
FIG. 6 is a partial plan view showing in detail a solid engagement mechanism for guide wheels of the vehicle of the invention.

As seen from FIGS. 3 and 6, push rods 22 are provided at the front and rear sides of the swivel axle assembly 3, these push rod 22 extending in parallel with the swivel axle assembly for reciprocal movement in its axial direction. A bracket 22a is secured to each push rod 22 at the midway portion thereof, and an air operative actuator 23 is disposed between each the bracket 3b on the axial assembly 3 and the bracket 22a.

On each of the opposite end portions of the axle assembly 3 there is provided a cam plate 24 rotatable in a horizontal plane and formed with cam surfaces 24a at its opposite sides, each connecting rod 22 being connected at its opposite ends to the cam plates 24. According to this arrangement, the cam plates 24 may be rotated when the associated air actuator 23 is alternately actuated.

On each of the guide wheel mounting arm 15 there is provided an outwardly projecting bracket 15b on which is mounted a cam follower 25 incorporating with one of the cam surfaces 24 of the cam plates 24. As shown in FIG. 6, when one of the air actuators 23, for instance that shown in upper portion of FIG. 6, is energized while the other one remains inoperative the connecting rod 22 incorporated with the energized actuator 23 moves to the left thereby to rotate the cam plate 24 in counter-clockwise direction in FIG. 6.

Upon such rotation of cam plates, each cam surface 24a shown in lower portion of FIG. 6 may be forced into engagement with each corresponding cam follower 25, so that one pair of mounting arms 15 and the pair of guide wheels 5 mounted thereon may be shifted toward and pressed against the opposite sides of the guide rail 4. Therefore, the pair of arms 15 thus pressed against the rail 4 will be held in fixed condition relative to the axle assembly 3.

While, the other pair of arms 15, whose associated cam followers are apart from their cooperating cam surfaces 24a, remain movable relative to the axle assembly 3 though it is resiliently urged toward the guide rail 4 by the action of the spring 16. Accordingly, the axle assembly 3 may be smoothly guided along the guide rail 4 by means of either one pair of guide wheels which is held in fixed position relative to the axle assembly. Although either one pair of arms 15 forward or rearward of the axle assembly 3 can be held firmly to the axle assembly, it is much preferable to hold firmly the forward one so as to keep a running vehicle in a more stable condition.

Further, as shown in FIGS. 3 and 4, on a bogie including the swivel axle assembly 3 there is provided a current collector beam 17, on the opposite ends of which beam there being supported possitive current collector 18. On the center of the beam 17 there is supported a negative current collector 19. Each positive current collector 18 and the negative current collector 19 are supported in slidable contact respectively with each power feed rail 10 and the upper surface of the guide rail 4.

Figure 7:
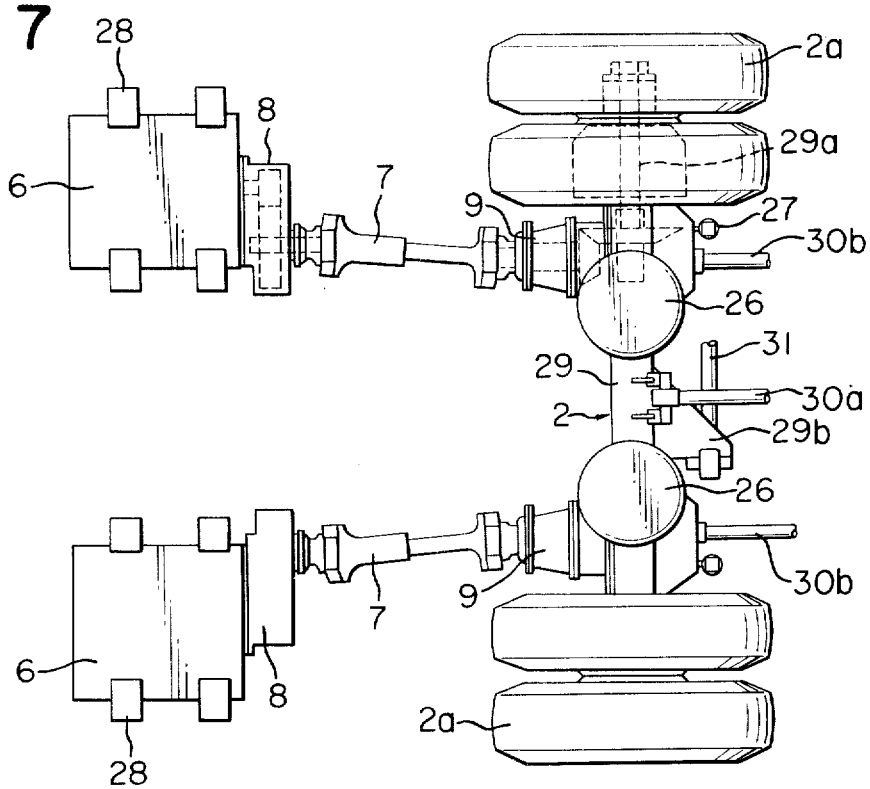
FIG. 7 is a plan view showing one embodiment of intermediate bogie of the vehicle of the invention.
Figure 8:
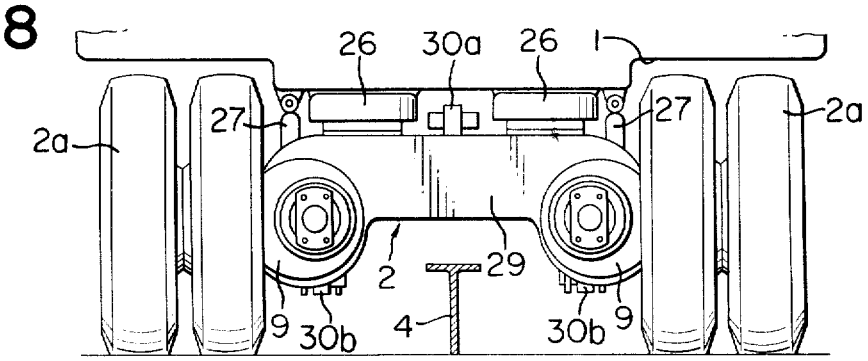
FIG. 8 is a front view of the intermediate bogie of FIG. 7.

FIGS. 7 and 8 are to show the detail of an intermediate bogie including the fixed drive axle assembly 2 disposed at the intermediate portion of the car body 1. As shown in FIG. 8, the axle assembly 2 includes an axle casing 29 supporting the car body 1 through a pair of pneumatic springs 26 and separate drive axles 29a are rotatably supported at the opposite portions of the axle casing 29. The driving wheels are mounted on the outer ends of the drive axles 29a.

Moreover, between the opposite end portions of the axle casing 29 and the car body 1 there are provided shock absorbers 27.

As shown by dotted lines in FIG. 7, within the axle casing 29 at its opposite end portions there are rotatably supported a drive axle 29a, the external end of the axle 29a is fixedly secured to driving wheel 2a and the internal end of each the axle is secured a power transmitting element such as bevel gears or the like.

Two separate electric propulsion motors 6 are mounted on the car body by fittings 28 and an output shaft of each of the motors is operatively connected to the power transmitting element of the driving axle 29a through a reduction gear 8, propeller shaft 7 and a second reduction gear 9. A connecting rod 30a is provided extending in a back and forth direction between the upper central portion of the axle casing 29 and the car body 1, and two connecting rods 30b extending in a back and forth direction is also provided to connect the lower opposite end portions of the axle casing 29 with the car body 1. Moreover, a transversely extending connecting rod 31 is provided to connect the bracket 29b on the axle casing 29 with the car body 1.

Now, with reference to FIG. 9, consideration will be made to motions of a vehicle as above constructed in accordance with the present invention when it moves from a straight guide way section into a successive curved guide way section. When the vehicle moves from a position shown by dotted lines where it is on an end of a straight guide way section into a successive position shown by solid lines where it is completely on a curved guide way section, the intermediate axle assembly 2 comes to a position displaced from the center of the guide way by a deviation "d". This means that the wheel 2a on each end of the intermediate axle assembly 2 has been caused to make a side slip in addition to the advancing rolling movement while the vehicle moved a distance S along the guide way. Such side slip of the intermediate axle assembly 2 is unavoidable in a vehicle with three axles.

However, in a vehicle according to the present invention, such side slip causes no substantial problems because rubber tires such as pneumatic rubber tires are used for the wheels 2a on the intermediate axle assembly. This fact will be made clear in FIG. 10 representing a typical relation between slip angle $\phi$ and resistance force to side slip, namely, concering force Fc, where the slip angle $\phi$ is defined by a ratio of side slip "d" to vehicle advancement "S" as shown in FIG. 9. In FIG. 10, a line A shows a Fc-$\phi$ characteristic curve for a rubber tire such as a pneumatic rubber tire, and the line B shows a Fc-curve for a steel on steel wheel. Further, in FIG. 10, there is shown by an indication "W" a range of slip angle $\phi$ which is applicable to a real three axle vehicle, and thus it is that the cornering force Fc for a rubber tire wheel is appreciably smaller than that for a steel on steel wheel in the whole range "W" of practical slip angle $\phi$. Usually, the value of "W" is about 2 or 3 degrees. Therefore, by making use of rubber wheels a three axle vehicle can smoothly move along a curved guide way.

FIG. 11 is a view like FIG. 7 but to show another embodiment of mounting means for electric propulsion motors, in which similar parts are indicated by the same reference numerals as those of FIG. 7. In this embodiment, the two electrical propulsion motors 6 are connected together by a frame 32 having a bracket 32a at its center portion, and also there is provided a mounting bracket 33 at the outward portion of each motor 6. The propulsion motors-unit thus connected together is mounted on the car body through a mount 35 provided on a bracket 32a of the frame 32 and two more mounts 34 provided on the opposite brackets 33 of the motors. According to this arrangement, each mounting for the motors-unit can be apart from each other by a relatively large distance and thus it is possible to make use of relatively soft and quite deformable elements in the mounts 34 and 35 thereby to prevent vibration and noise more effectively.

FIG. 12 shows a further another embodiment of mounting means for the electric motors, in which each motor 6 is connected to the axle casing 29 through a gear case 37 having therein a reduction gear mechanism. This arrangement is effective to enhance the isolation of vibration and noise between the car body 1 and the bogie with propulsion unit.

Figure 13:
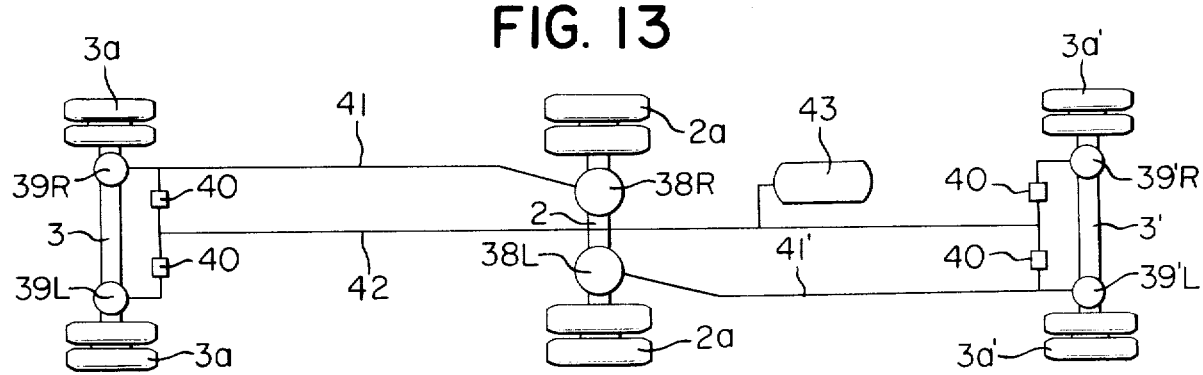
FIG. 13 is an outlined plan view illustrating an air feeding system for pneumatic springs for suspending a vehicle of the invention.

FIG. 13 is a diagram shows exemplified air feeding lines for an air suspension system for a vehicle of the present invention. In the diagram, two large pneumatic springs 38L, 38R are provided on the intermediate axle assembly 2, and on the front and rear axle assemblies 3 and 3' there are two pairs of small pneumatic springs 39L, 39R and 39'L and 39'R, respectively. Also, on each side portion of each of the front and rear axle assemblies 3, 3', there is provided an automatic height control valve 40 for detecting and controlling height of the associated pneumatic springs. This type of pneumatic spring is well known in the prior art, for example see U.S. Pat. No. 3,933,368. The operation of an automatic height control valve, such a valve 40, is known in the art, for example see the SAE JOURNAL for March 1956, pages 56 and 57 and FIG. 5 thereof. The control of the height of the pneumatic springs 39R, 39L, 39'R and 39'L is performed by charging or discharging the respective pneumatic springs. The charged pneumatic springs 38R and 38L on the intermediate axle assembly 2 are connected to the pneumatic spring 39R on the rear axle assembly 3 and the pneumatic spring 39'L on the front axle assembly 3', respectively, through their associated pipings 41 and 41'. Feeding of compressed air to the control valves 40 may be performed from an accumulator 43 of a vehicle through a piping 42.

Figure 14:
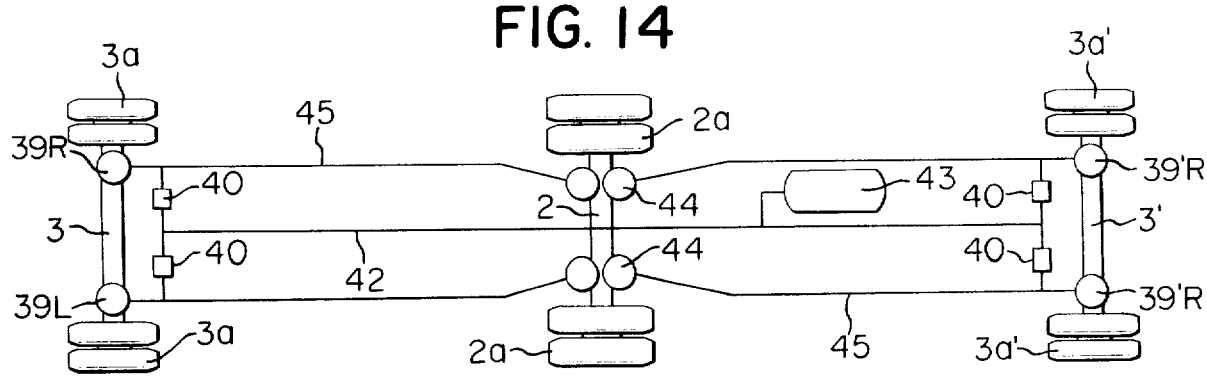
FIG. 14 is an outlined plan view illustrating another form of air feeding system for pneumatic springs for suspending a vehicle of the invention.

FIG. 14 shows another embodiment of air feeding lines for an air suspension system of a vehicle, wherein there are provided four pneumatic springs 44 on the intermediate axle assembly 2, which pneumatic springs are connected individually to the pneumatic springs 39R, 39L on the axle assembly 3 and the pneumatic springs 39'R, 39'L on the axle assembly 3' through their pipings 45.

In either embodiment as shown in FIG. 13 or FIG. 14, the central axle assembly 2 can be given an appropriate load share by controlling load shares of the front and rear axle assemblies 3, 3'. Actual value of the load share for each of the axle assemblies can be freely determined by appropriately relating the effective areas of the pneumatic springs on the front and rear axle assemblies in proportion to that of the large pneumatic springs on the intermediate axle assembly.

The invention has thus been shown and described with reference to specific embodiments, however, it should be noted that the invention is in no way limited to the details of the illustrated structures but changes and modifications may be made without departing from the scope of the appended claims.

I claim:

1. A guide way vehicle adapted for running on guide way means having running surface means and guide rail means disposed on the running surface means, wherein the vehicle comprises a rigid unitary car body having three axle assemblies mounted respectively at the front, rear, and intermediate portions thereof, each axle assembly having wheels with rubber tires attached to the opposite ends thereof; the axle assemblies at the front and rear portions of the car body being pivotally mounted to swivel about a substantially vertical axis and respectively having guide wheels mounted for running along said guide rail means whereby the axle assemblies are steered along the guide rail means; the intermediate driving axle assembly being secured to the car body to prevent its swivel motion in a horizontal plane relative thereto and having oppositely and coaxially mounted drive axles with a rubber tire at the outer end of each axle; separate power means drivingly connected to said drive axles to drive them independently from each other; the tires on the intermediate driving axle assembly having a diameter greater than that of the tires on the front and rear axle assemblies; a cut-away configuration on the car body for partially accommodating the tire on the intermediate driving axle assembly to effectively lower the overall height of the vehicle.

2. A guide way vehicle in accordance with claim 1 in which each of the three axle assemblies have pneumatic spring means to support the car body.

3. A guide way vehicle in accordance with claim 1, wherein the respective power means are electric motors which are connected together by means of a support frame to form a structural assembly which is connected at its opposite end portions to the car body.

4. A guide way vehicle in accordance with claim 1, wherein each driving power means is supported directly by the intermediate axle assembly.

5. A guide way vehicle in accordance with claim 1, wherein each axle assembly includes dual rubber tires mounted at each outer end portion thereof.

6. A guide way vehicle in accordance with claim 1, wherein the spring means associated with the intermediate driving axle assembly has an effective capacity greater than that of the spring means on each of the front and rear assemblies so that the load share of each of the front and rear axle assemblies is less than the load on said intermediate assembly.

7. A guide way vehicle adapted for running on a guide way having a horizontal running surface and a central vertically extending guide rail, said vehicle comprising:
(a) a car body of rigid unitary construction having front, rear and intermediate axle assemblies, each assembly having wheels with attached rubber tires at the distal ends thereof to contact said horizontal running surface on opposite sides of said car body;
(b) the front and rear axle assemblies being mounted to swivel in a horizontal plane relative to the car body, each assembly having guide wheels mounted to contact said guide rail to steer the assembly along the guide rail;
(c) the intermediate axle assembly being secured to the car body to prevent its swivel motion in a horizontal plane, said intermediate assembly having driving power means coupled thereto for rotating the tires thereof independently of each other to propel the vehicle along the guide way; and
(d) said car body having a cut-away configuration over the central driving axle for partially accommodating the tires thereof.

* * * * *